United States Patent [19]

Kaminskas

[11] Patent Number: 4,955,559
[45] Date of Patent: Sep. 11, 1990

[54] THRUST VECTOR CONTROL SYSTEM FOR AEROSPACE VEHICLES

[75] Inventor: Rimvykas A. Kaminskas, Palos Verdes Estates, Calif.

[73] Assignee: TRW Inc., Redondo Beach, Calif.

[21] Appl. No.: 148,563

[22] Filed: Jan. 26, 1988

[51] Int. Cl.$^5$ ............................................. B64L 15/12
[52] U.S. Cl. ..................................... 244/52; 244/169; 244/172; 244/3.22
[58] Field of Search ...................... 244/52, 56, 169, 51, 244/3.22, 172

[56] References Cited

U.S. PATENT DOCUMENTS

| | | | |
|---|---|---|---|
| 2,086,545 | 7/1937 | Fator | 244/52 |
| 3,032,982 | 5/1962 | Gaubatz | 60/35.55 |
| 3,048,011 | 8/1962 | Tumavicus | 244/3.22 |
| 3,064,419 | 11/1962 | Ward | 244/52 |
| 3,070,329 | 12/1962 | Hasbrouck | 244/52 |
| 3,140,584 | 7/1964 | Ritchey et al. | 60/35.55 |
| 3,142,153 | 7/1964 | Hensley | 60/35.55 |
| 3,188,024 | 6/1965 | Schneider | 244/52 |
| 3,200,587 | 8/1965 | Tolson | 244/52 |
| 3,270,505 | 9/1966 | Crabill et al. | 60/35.55 |
| 3,392,918 | 7/1968 | Goldberg | 239/265.35 |
| 3,532,304 | 10/1970 | Pyptiuk | 244/52 |
| 3,662,973 | 5/1972 | Paine et al. | 244/169 |
| 3,696,999 | 10/1972 | Desjardins et al. | 239/265.35 |
| 4,104,877 | 8/1977 | Bone et al. | 60/230 |
| 4,157,788 | 6/1979 | Canfield et al. | 239/265.35 |

Primary Examiner—Galen Barefoot
Attorney, Agent, or Firm—James M. Steinberg; Sol L. Goldstein

[57] ABSTRACT

An improved thrust vector control system for steering and controlling an aerospace vehicle propelled by a reaction type motor. The improved thrust vector control system simultaneously rotates and laterally translates the reaction motor with respect to the longitudinal axis of the vehicle. This complex motion of the reaction motor generates sufficiently large control moments that allows the reaction motor to be moved very close to the center of gravity of the vehicle. As a result, the vehicle can be shortened and the structure that is typically required to position the reaction motor at a swivel point farther aft eliminated.

10 Claims, 3 Drawing Sheets

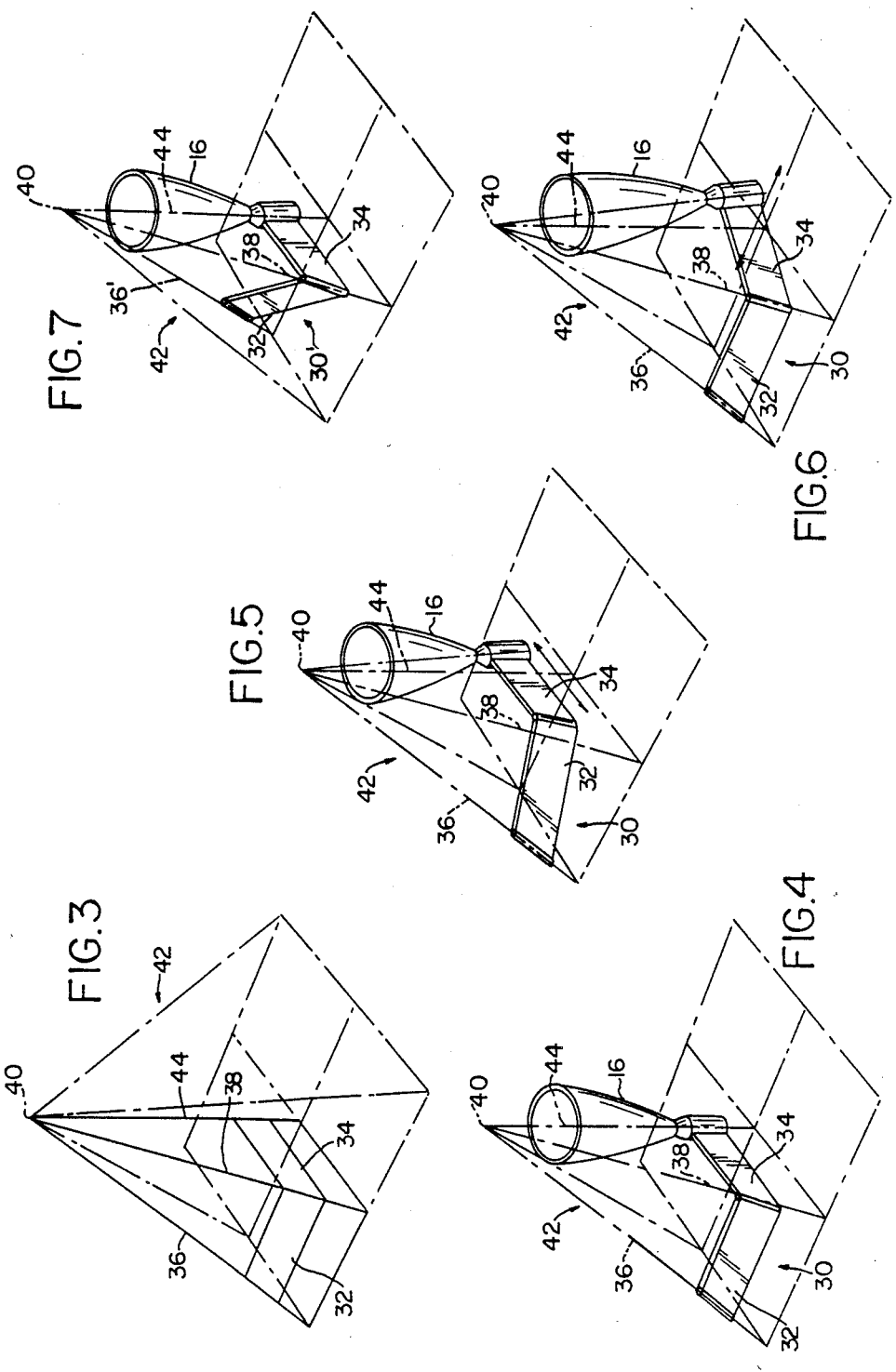

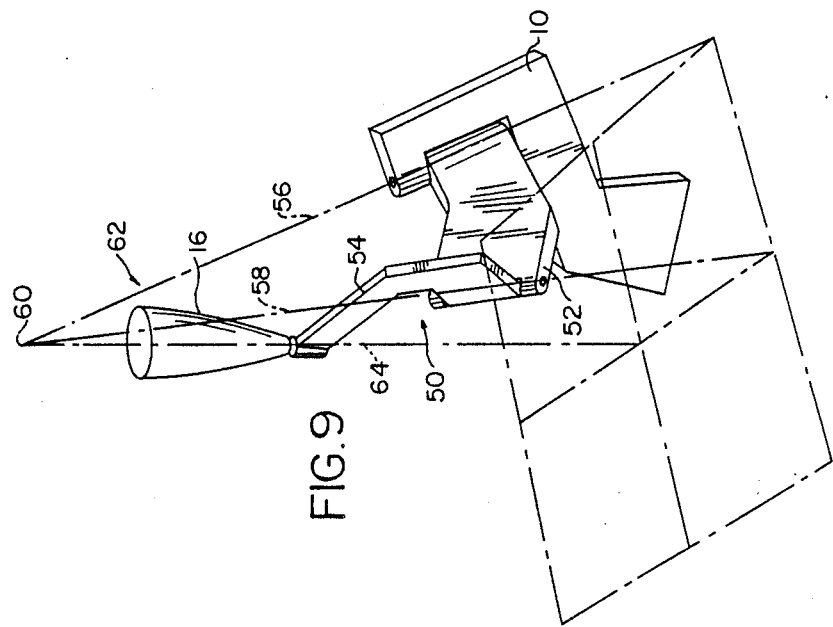
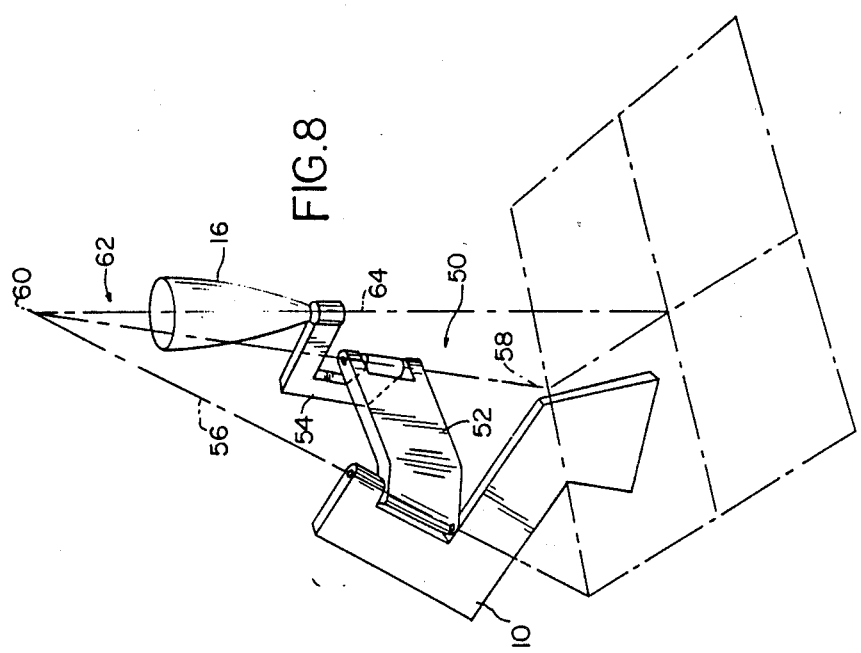

THRUST VECTOR CONTROL SYSTEM FOR AEROSPACE VEHICLES

BACKGROUND OF THE INVENTION

This invention relates generally to aerospace vehicles, such as airplanes, spacecraft and other vehicles that are designed for use at high altitudes and in outer space and propelled by reaction type motors, and, more particularly, to thrust vector control systems for controlling and steering these types of vehicles.

Aerospace vehicles propelled by a reaction type motor, such as a rocket motor, are generally controlled and steered by some type of movement of the thrust axis of the rocket motor with respect to the longitudinal axis of the vehicle. This type of control of a rocket-propelled vehicle is commonly referred to as thrust vector control. Conventional thrust vector control systems utilize several different approaches for moving the thrust axis of the rocket motor. One conventional thrust vector control system utilizes an articulated exhaust nozzle to deflect the exhaust gas and thereby tilt the thrust axis of the rocket motor with respect to the vehicle axis. Another conventional thrust vector control system employs heat-resistant vanes that are positioned within the discharge portion of the exhaust nozzle to deflect the exhaust gas and tilt the thrust axis of the rocket motor.

Still another conventional thrust vector control system utilizes a rocket motor that is pivotally mounted on the vehicle so that the entire rocket motor can be tilted relative to the vehicle axis. This type of control system usually takes the form of a large, fixed rocket motor that is used only for propulsion and several small, gimballed rocket motors arranged around the outer periphery of the vehicle that are used for steering and control.

Finally, another conventional thrust vector control system relies on lateral displacement of the thrust axis of the rocket motor with respect to the vehicle axis. Several examples of this type of thrust vector control system include a control system that laterally displaces the exhaust nozzle of the rocket motor, as disclosed in U.S. Pat. No. 3,200,587 to Tolson and U.S. Pat. Nos. 3,392,918 and 3,258,915 to Goldberg, a control system that laterally displaces the throat of the rocket motor, as disclosed in the Goldberg references, and a control system that employs a cone-shaped member positioned in the exhaust passage of the rocket motor, as disclosed in U.S. Pat. No. 3,188,024 to Schneider. The cone-shaped member described in the Schneider reference is mounted eccentrically in the inner portion of a ring, the ring being movable within the exhaust passage of the rocket motor to vary the space between the sides of the exhaust passage and the cone-shaped member to force more of the exhaust gas to flow on one side of the cone-shaped member or the other.

Although each of the various types of thrust vector control systems has its advantages, each of the systems also has several disadvantages. For example, thrust vector control systems that rely on some form of interference with the path of the exhaust gas as it exits the combustion chamber have an adverse effect on the efficiency of the rocket motor. This is because a change in the direction of the exhaust path from a straight to an angled path causes turbulence. Control systems that utilize an articulated nozzle require a gastight seal between the movable nozzle and the casing of the motor. Considerable difficulty has arisen when attempting to design gastight seals that will contain the flaming, erosive, high pressure gases ejected from the combustion chamber and still allow the nozzle to be easily moved by lightweight actuators over a practical deflection angle.

Finally, for control systems that rely on a tilting of the thrust axis, the swivel point of the thrust axis must be located well aft of the center of gravity of the vehicle if sufficiently large control moments are to be generated. Likewise, for control systems that rely on a lateral displacement of the thrust axis, the rocket motor must be allowed to move over relatively large lateral distances to generate the required control moments. Accordingly, there still exists a need for an improved thrust vector control system. The present invention clearly fulfills this need.

SUMMARY OF THE INVENTION

The present invention resides in an improved thrust vector control system for steering and controlling an aerospace vehicle propelled by a reaction type motor. Briefly, and in general terms, the improved thrust vector control system simultaneously rotates and laterally translates the reaction motor with respect to the longitudinal axis of the vehicle. This complex motion of the reaction motor generates sufficiently large control moments that allows the reaction motor to be moved very close to the center of gravity of the vehicle.

More specifically, in a presently preferred embodiment of the invention, a gimbal system for rotating and laterally translating a reaction type motor, such as a rocket motor, includes a first and second hinged member. One end of the first hinged member is rotatably attached at its hinge axis to the vehicle, while the hinged end of the second hinged member is rotatably attached at its hinge axis to the other end of the first hinged member. The rocket motor is rigidly attached to the non-hinged end of the second hinged member. The two hinge axes intersect at an apex of a pyramid, one of the hinge axes forming a corner of the pyramid and the other hinge axis forming a centerline of one of the sides of the pyramid. Rotating the gimbal system moves the rocket motor away from the centerline of the pyramid and rotates the motor such that the thrust axis always intersects the apex of the pyramid. The control moment that is generated by this complex motion of the rocket motor is the same as the moment that would be generated if the rocket motor were rotated about the apex of the pyramid.

One of the advantages of this gimbal system is that the rocket motor can be displaced laterally without any side force being applied to the rocket motor. Only rotational forces are applied to the two hinged members about their respective hinge axes to rotate and laterally translate the rocket motor. Another advantage of this gimbal system is that the relative amount of rotation and lateral displacement can be easily adjusted. As the height of the pyramid is increased, more translation and less rotation of the rocket motor occurs. Pure translation results when the apex is extended to infinity. Conversely, as the height of the pyramid is decreased, more rotation and less translation of the motor occurs. Pure rotation results when the apex lies at the base of the pyramid.

It will be appreciated from the foregoing that the present invention provides an improved thrust vector control system for rocket-propelled vehicles. The improved control system allows a rocket motor to be positioned much closer to the center of gravity of the vehicle than control systems of the prior art, without reducing the control moments that are generated by the control system. As a result, the vehicle can be shortened and the structure that is typically required to position the reaction motor at a swivel point farther aft eliminated. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 3 through 6 illustrate conceptually the principles of operation of a gimbal system in accordance with a presently preferred embodiment of the invention;

FIG. 7 illustrates conceptually the principles of operation of a gimbal system in accordance with an alternatively preferred embodiment of the invention;

FIG. 8 is a front elevational view of a gimbal system in accordance with the presently preferred embodiment of the invention; and FIG. 9 is a rear elevational view of a gimbal system in accordance with the presently preferred embodiment of the invention.

DETAILED DESCRIPTION OF THE PREFERRED EMBODIMENTS

Figure 1:
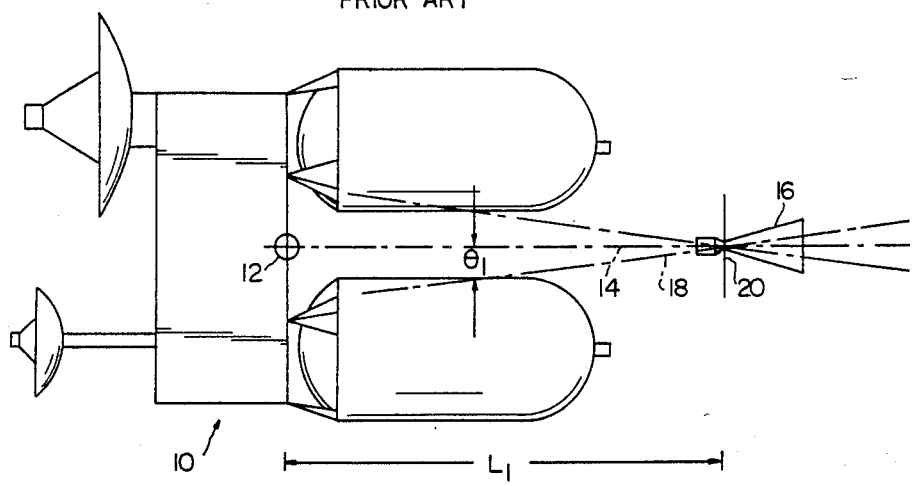
FIG. 1 is an elevational view of a spacecraft utilizing a thrust vector control system in accordance with the prior art.

As shown in the drawings for purposes of illustration, the present invention is embodied in a thrust vector control system for steering and controlling an aerospace vehicle propelled by a reaction type motor. Aerospace vehicles propelled by a reaction type motor, such as a rocket motor, are generally controlled and steered by some type of movement of the thrust axis of the rocket motor with respect to the longitudinal axis of the vehicle. This type of control of a rocket-propelled vehicle is commonly referred to as thrust vector control. Conventional thrust vector control systems utilize several different approaches for moving the thrust axis of the rocket motor, but these control systems generally require that the swivel point of the thrust axis be located well aft of the center of gravity of the vehicle if sufficiently large control moments are to be generated.

In accordance with the present invention, an improved thrust vector control system simultaneously rotates and laterally translates the rocket motor with respect to the longitudinal axis of the vehicle. This complex motion of the reaction motor generates sufficiently large control moments that allows the rocket motor to be moved very close to the center of gravity of the vehicle.

Figure 2:
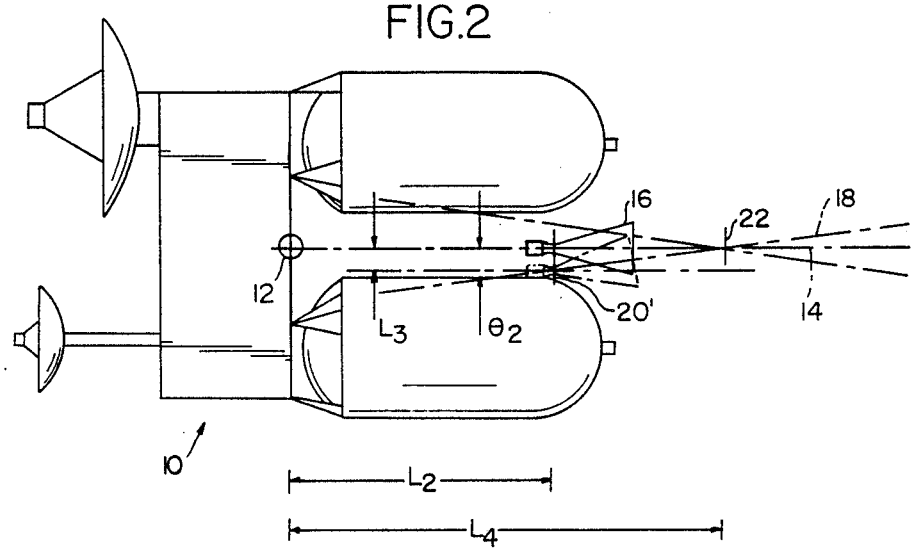
FIG. 2 is an elevational view of a spacecraft utilizing a thrust vector control system in accordance with the present invention.

FIGS. 1 and 2 illustrate a spacecraft 10 having a center of gravity 12 positioned along a longitudinal axis 14, the center of gravity 12 shifting lengthwise along the axis 14 as fuel is consumed by the vehicle. The spacecraft 10 is propelled by a rocket motor 16 having a thrust axis 18 that is generally aligned with the vehicle axis 14 when no control or steering inputs are present.

FIG. 1 illustrates a spacecraft 10 that utilizes a thrust vector control system in accordance with the prior art. The prior art control system provides steering and control of the vehicle by a rotation of the rocket motor 16 about a swivel point 20 far aft of the center of gravity 12. Such rotations of the rocket motor 16 tilt the thrust axis 18 from the vehicle axis 14 by an angle $\Theta_1$, with the resultant moment about the center of gravity 12 causing the vehicle to turn. The vehicle will continue to turn about its center of gravity until the motor is rotated to realign the thrust axis 18 with the vehicle axis 14. The control moment generated by the rotation of the rocket motor 16 is equal to $$\text{Thrust} * L_1 * \sin \Theta_1$$

where $L_1$ is the longitudinal distance between the center of gravity 12 of the vehicle and the swivel point 20 of the rocket motor 16 and $\Theta_1$ is the angle between the longitudinal axis 12 of the vehicle and the thrust axis 18.

FIG. 2 illustrates a spacecraft 10 that utilizes a thrust vector control system in accordance with the present invention. The control system of the present invention provides steering and control of the vehicle by simultaneously rotating and laterally translating the rocket motor 16. Although the rocket motor 16 is rotated about a swivel point 20', the control moment generated by this complex motion is the same as the moment that would be generated if the rocket motor 16 were rotated about a swivel point 22 much farther aft of the center of gravity 12 than swivel point 20'. As a result, the vehicle can be shortened and the structure that is typically required to position the rocket motor at swivel point 22 eliminated. The control moment generated by the rotation and lateral displacement of rocket motor 16 is equal to $$\text{Thrust}*(L_2*\sin \Theta_2 + L_3*\cos \Theta_2)$$

where $L_2$ is the longitudinal distance between the center of gravity 12 of the vehicle and the swivel point 20' of the rocket motor 16, $L_3$ is the lateral distance between the longitudinal axis 14 of the vehicle and the swivel point 20', and $\Theta_2$ is the angle between the longitudinal axis 12 of the vehicle and the thrust axis 18. This control moment is also equal to $$\text{Thrust} * L_4 * \sin \Theta_2$$

where $L_4$ is the longitudinal distance between the center of gravity 12 of the vehicle and the swivel point 22.

FIGS. 3 through 6 illustrate conceptually the principles of operation of a gimbal system 30 that simultaneously rotates and laterally translates a rocket motor in accordance with a presently preferred embodiment of the invention. As shown in FIGS. 3 and 4, the gimbal system 30 includes two hinged members 32, 34, with rocket motor 16 being rigidly attached to the non-hinged end of hinged member 34. One end of hinged member 32 is rotatably attached at its hinge axis 36 to the vehicle, while the hinged end of hinged member 34 is rotatably attached at its hinge axis 38 to the other end of hinged member 32. The hinge axes 36, 38 intersect at a point 40, thus forming a pyramid 42, with point 40 being the apex of the pyramid and hinge axes 36, 38 forming a corner of the pyramid 42 and the centerline of one of the sides of the pyramid, respectively. The apex 40 of the pyramid 42 corresponds to pivot point 22 shown in FIG. 2 and a centerline 44 of the pyramid 42 corresponds to the longitudinal axis 14 of the vehicle. As shown in FIGS. 5 and 6, rotating the gimbal system 30 moves the rocket motor 16 away from the centerline 44 of the pyramid 42 and causes the motor to rotate such that the thrust axis 18 of the rocket motor 16 always intersects the apex 40 of the pyramid 42. The control moment that is generated by this complex motion of the rocket motor is the same as the moment that would be generated if the rocket motor were rotated about the apex 40 of the pyramid 42.

FIG. 7 illustrates conceptually the principles of operation of a gimbal system 30' in accordance with an alternatively preferred embodiment of the invention. Gimbal system 30' is identical to gimbal system 30 except that hinge axis 36, identified as hinge axis 36', forms the centerline of one of the sides of the pyramid 42 rather than a corner of the pyramid.

FIGS. 8 and 9 illustrate a gimbal system 50 in accordance with the presently preferred embodiment of the invention. The gimbal system 50 includes two hinged members 52, 54, with rocket motor 16 being rigidly attached to the non-hinged end of hinged member 54. One end of hinged member 52 is rotatably attached at its hinge axis 56 to the vehicle 10, while the hinged end of hinged member 54 is rotatably attached at its hinge axis 58 to the other end of hinged member 52. The hinge axes 56, 58 intersect at a point 60, thus forming a pyramid 62, with point 60 being the apex of the pyramid and hinge axes 56, 58 forming a corner of the pyramid 62 and the centerline of one of the sides of the pyramid, respectively. The apex 60 of the pyramid 62 corresponds to pivot point 22 shown in FIG. 2 and a centerline 64 of the pyramid 62 corresponds to the longitudinal axis 14 of the vehicle 10.

One of the advantages of gimbal system 50 is that the rocket motor 16 can be displaced laterally without any side force being applied to the rocket motor. Only rotational forces are applied to the two hinged members 52, 54 about their respective hinge axes 56, 58 to rotate and laterally translate the rocket motor. Another advantage of this gimbal system is that the relative amount of rotation and lateral displacement can be easily adjusted. As the height of the pyramid 62 is increased, more translation and less rotation of the rocket motor 16 occurs. Pure translation results when the apex 60 is extended to infinity. Conversely, as the height of the pyramid 62 is decreased, more rotation and less translation of the motor occurs. Pure rotation results when the apex lies at the base of the pyramid.

From the foregoing, it will be appreciated that the present invention provides an improved thrust vector control system for rocket-propelled vehicles. The improved control system allows a rocket motor to be positioned much closer to the center of gravity of the vehicle than control systems of the prior art, without reducing the control moments that are generated by the control system. As a result, the vehicle can be shortened and the structure that is typically required to position the reaction motor at a swivel point farther aft eliminated. Although several preferred embodiments of the invention have been shown and described, it will be apparent that other adaptations and modifications can be made without departing from the spirit and scope of the invention. Accordingly, the invention is not to be limited, except as by the following claims.

I claim:

1. A thrust vector control system for an aerospace vehicle propelled by a reaction motor, comprising:
    means for simultaneously rotating and laterally translating the reaction motor with respect to an axis of the vehicle to provide increased control moments over simple rotation or translation of the reaction motor for improved steering and controlling of the vehicle.

2. The control system as set forth in claim 1, wherein the reaction motor is a rocket motor.

3. A thrust vector control system for an aerospace vehicle propelled by a reaction motor, comprising:
    a first hinged member having a hinge axis located at one end of the member, the first hinged member being rotatably attached at its hinge axis to the vehicle;
    a second hinged member having a hinge axis located at one end of the member, the second hinged member being rotatably attached at its hinge axis to the other end of the first hinged member, the reaction motor being rigidly attached to the non-hinged end of the second hinged member;
    wherein the hinge axes of the first and second hinged members and an axis of the vehicle intersect to form a pyramid such that the control system simultaneously rotates and laterally translates the reaction motor with respect to the axis of the vehicle for steering and controlling the vehicle.

4. The control system as set forth in claim 3, wherein the control moment that is generated by the rotation and lateral translation of the reaction motor is approximately equal to the moment that would be generated if the reaction motor were rotated about the apex of the pyramid.

5. The thrust control system as set forth in claim 3, wherein one hinge axis forms a corner of the pyramid and the other hinge axis forms a centerline of one of the sides of the pyramid.

6. The thrust control system as set forth in claim 3, wherein each of the hinge axes forms a centerline of one of the sides of the pyramid.

7. A thrust vector control system for an aerospace vehicle having a longitudinal axis and a center of gravity located on the longitudinal axis, the aerospace vehicle being propelled by a rocket motor having a thrust axis, comprising:
    a first hinged member having a hinge axis located at one end of the member, the first hinged member being rotatably attached at its hinge axis to the vehicle;
    a second hinged member having a hinge axis located at one end of the member, the second hinged member being rotatably attached at its hinge axis to the other end of the first hinged member, the rocket motor being rigidly attached to the non-hinged end of the second hinged member;
    wherein the hinge axes of the first and second hinged members and the longitudinal axis of the vehicle intersect to form a pyramid, the control system simultaneously rotating and laterally displacing the rocket motor with respect to the longitudinal axis of the vehicle so that the thrust axis of the rocket motor always intersects the apex of the pyramid;
    and wherein the control moment that is generated by the control system about the center of gravity of the vehicle is approximately equal to the moment that would be generated if the rocket motor were rotated about the apex of the pyramid.

8. The thrust control system as set forth in claim 7, wherein one hinge axis forms a corner of the pyramid and the other hinge axis forms a centerline of one of the sides of the pyramid.

9. The thrust control system as set forth in claim 7, wherein each of the hinge axes forms a centerline of one of the sides of the pyramid.

10. A method for steering and controlling an aerospace vehicle propelled by a reaction motor, comprising the step of:

simultaneously rotating and laterally translating the reaction motor with respect to an axis of the vehicle to provide increased control moments over simple rotation or translation of the reaction motor for improved steering and controlling of the vehicle.

* * * * *